(12) United States Patent
Chrabascz et al.

(10) Patent No.: US 9,809,322 B2
(45) Date of Patent: Nov. 7, 2017

(54) RAM AIR FAN TERMINAL STUD

(75) Inventors: Eric Chrabascz, Longmeadow, MA (US); Craig M. Beers, Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1273 days.

(21) Appl. No.: 13/349,112

(22) Filed: Jan. 12, 2012

(65) Prior Publication Data

US 2013/0183870 A1 Jul. 18, 2013

(51) Int. Cl.
*H01R 13/73* (2006.01)
*B64D 41/00* (2006.01)

(52) U.S. Cl.
CPC ....... *B64D 41/007* (2013.01); *Y10T 29/49117* (2015.01)

(58) Field of Classification Search
CPC ...................................................... H01R 13/73
USPC ........................... 439/709, 564, 595; 411/107
See application file for complete search history.

(56) References Cited

U.S. PATENT DOCUMENTS

| | | | | |
|---|---|---|---|---|
| 2,820,972 | A * | 1/1958 | Ptak ................................. | 470/8 |
| 3,271,601 | A | 9/1966 | Raver | |
| 3,324,383 | A | 6/1967 | Raver | |
| 3,711,138 | A * | 1/1973 | Davis ......................... | 403/408.1 |
| 4,235,560 | A * | 11/1980 | Schimmel ..................... | 403/388 |
| 5,214,987 | A * | 6/1993 | Fenton, Sr. ...................... | 81/460 |
| 5,266,861 | A | 11/1993 | Schollhorn | |
| 5,564,874 | A * | 10/1996 | Agatonovic .................. | 411/424 |
| 5,651,649 | A | 7/1997 | Sadri et al. | |
| 6,607,339 | B1 * | 8/2003 | Mangapora .................... | 411/107 |
| 6,864,015 | B2 * | 3/2005 | Peterson et al. ............... | 429/182 |
| 6,982,506 | B1 | 1/2006 | Johnsen | |
| 7,527,523 | B2 * | 5/2009 | Yohn et al. .................... | 439/564 |
| 7,757,502 | B2 | 7/2010 | Merritt et al. | |
| 7,892,049 | B1 | 2/2011 | Andler et al. | |
| 2002/0115317 | A1 * | 8/2002 | Delcourt et al. ................. | 439/84 |
| 2003/0021650 | A1 | 1/2003 | Wojciechowski et al. | |
| 2005/0214095 | A1 * | 9/2005 | Brown et al. ................ | 411/80.1 |
| 2006/0061973 | A1 | 3/2006 | Wainwright et al. | |
| 2010/0033893 | A1 | 2/2010 | Dolfi et al. | |

FOREIGN PATENT DOCUMENTS

| | | |
|---|---|---|
| CN | 201051548 | 4/2008 |
| CN | 201221529 | 4/2009 |
| CN | 201673801 | 12/2010 |
| CN | 201927735 | 8/2011 |

OTHER PUBLICATIONS

ASME B18.2.1 Square Head Bolts—reprint of standards for bolts—no date.*
ASME B18.2.1 Hex Head Bolts—1996 (rev.2005).*

* cited by examiner

*Primary Examiner* — Xuong Chung Trans
(74) *Attorney, Agent, or Firm* — Carlson, Gaskey & Olds, P.C.

(57) ABSTRACT

An example terminal stud of a ram air fan connection assembly has a threaded portion extending from a head that is held within a slot of a base. The head has a sidewall that interfaces directly with the base. The sidewall has a length and a height. A ratio of the length to the height is from 2.18 to 2.35.

18 Claims, 4 Drawing Sheets

RAM AIR FAN TERMINAL STUD

BACKGROUND

This disclosure relates generally to a terminal stud for a ram air fan and, more particularly, to an anti-rotational feature of the terminal stud.

Fans are often used to move air. Fans may, for example, move air through heat exchangers of air conditioning packs on aircraft. The air moved by the fans cools the heat exchangers.

A typical fan within an aircraft is a ram air fan. When the aircraft is stationary, a motor is used to rotate the ram air fan. A controller that is electrically coupled to the motor controls rotation of the ram air fan. Terminal studs are used to electrically couple leads of the controller to leads of motor. In one example, nuts torqued to the terminal stud hold the leads in an electrically coupled position. The terminal stud includes anti-rotation features that limit movement of the terminal stud during the torquing.

SUMMARY

An example terminal stud of a ram air fan connection assembly has a threaded portion extending from a head that is held within a slot of a base. The head has a sidewall that interfaces directly with the base. The sidewall has a length and a height. A ratio of the length to the height is from 2.18 to 2.35.

An example ram air fan terminal block including a housing and a base having a plurality of slot walls that provide a slot. The terminal studs each have a threaded portion extending from a head. The head is received within the slot and the threaded portion extends through an aperture in the base. The head has a sidewall that interfaces directly with one of the slot walls. A ratio of a length of the sidewall to a height of the sidewall is from 2.18 to 2.35.

An example method of electrically coupling a ram air fan assembly motor to a controller includes torquing a threaded fastener to a terminal stud to hold a lead of a ram air fan motor in an electrically coupled position with a lead of a controller. The method includes contacting a sidewall of a head of the terminal stud to limit rotation of the terminal stud during the torquing. The sidewall has a length and a height. A ratio of the length to the height is from 2.18 to 2.35.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
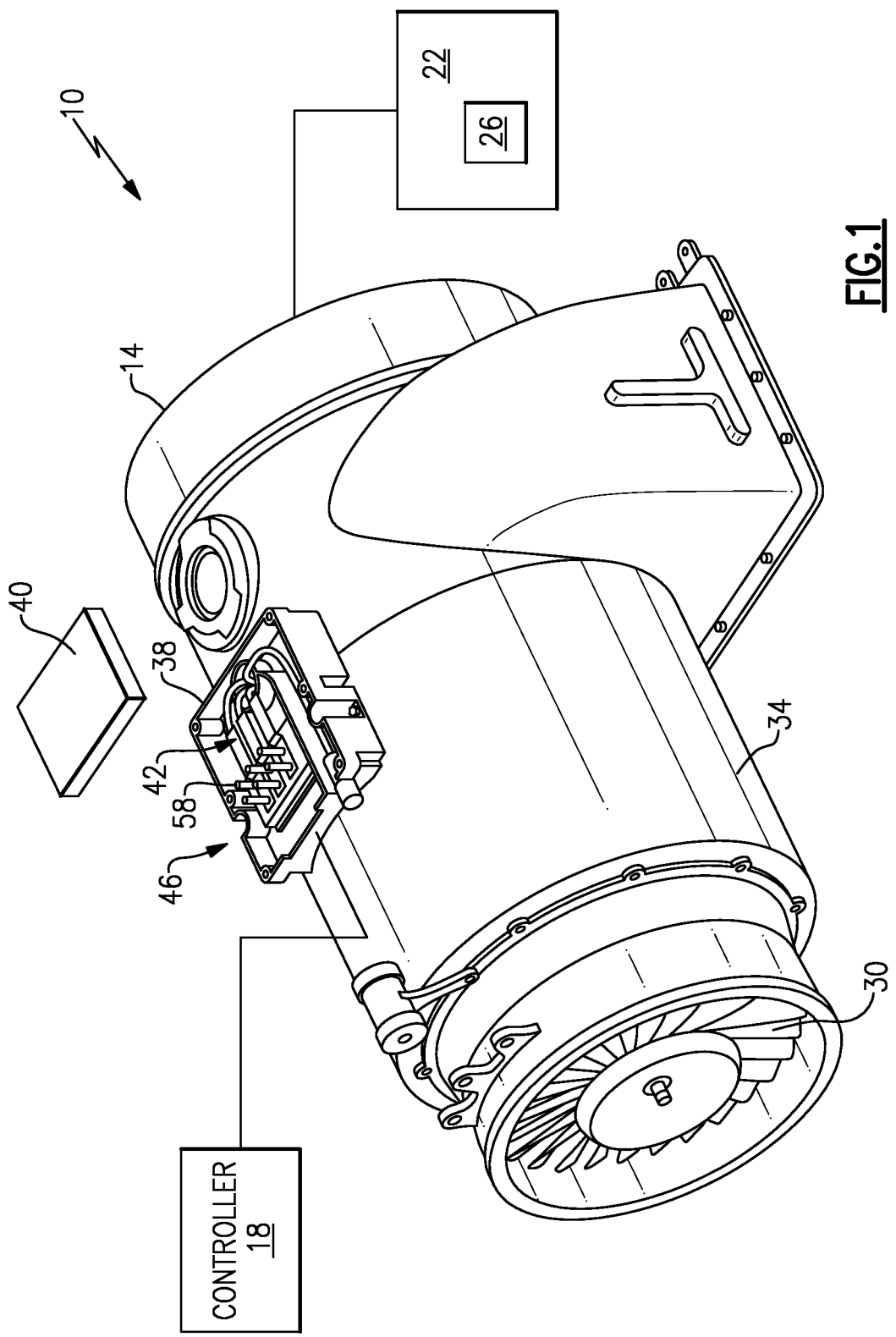
FIG. 1 shows a partially schematic view of a ram air fan within an aircraft air conditioning system.
Figure 2:
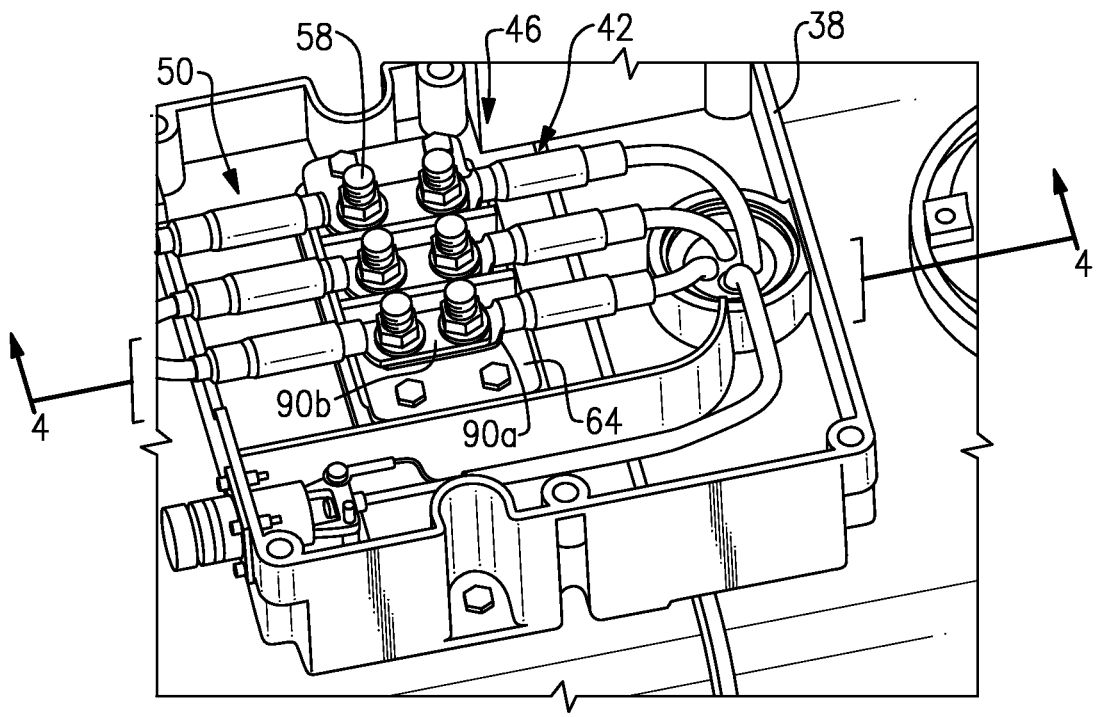
FIG. 2 shows a close-up view of motor leads electrically coupled to controller leads within a terminal block of the FIG. 1 ram air fan.
Figure 3:
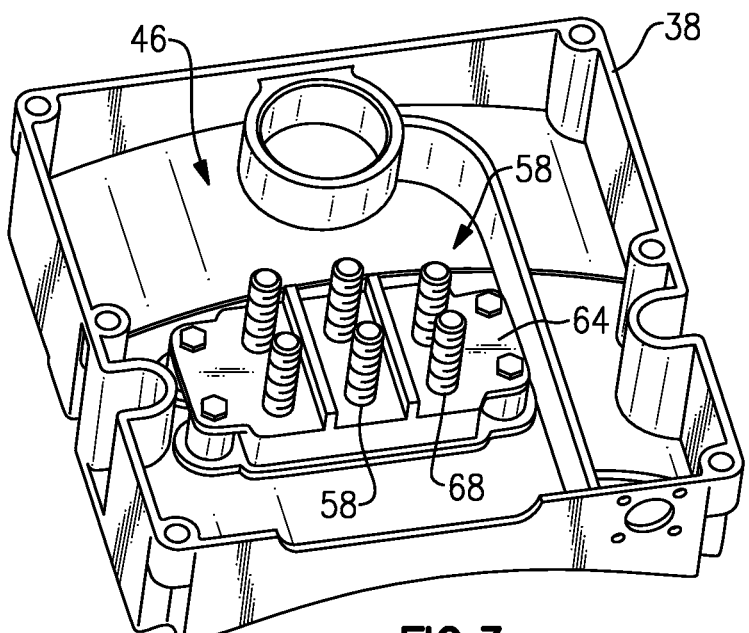
FIG. 3 shows the FIG. 2 terminal block with the leads removed.
Figure 4:
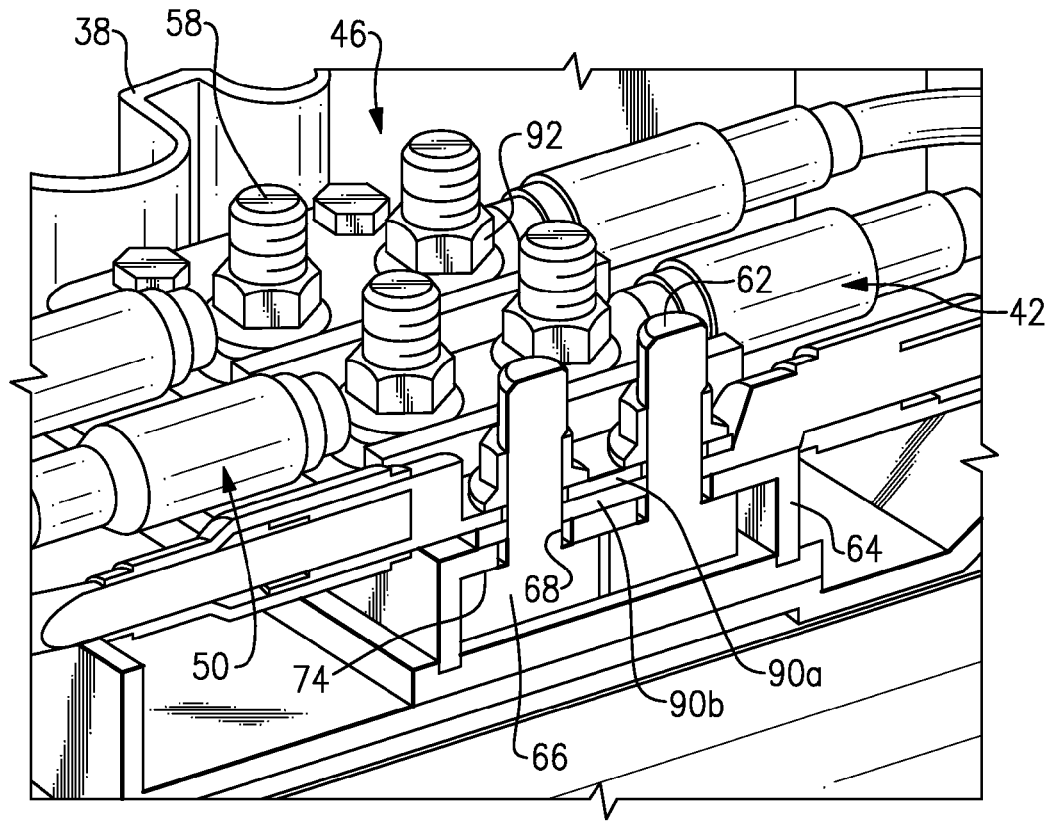
FIG. 4 shows a close-up section view at line 4-4 in FIG. 2.

Referring to FIGS. 1-4, an example aircraft air conditioning system 10 of an aircraft includes a ram air fan 14, a controller 18, and air conditioning packs 22. In this example, the ram air fan 14 moves air across heat exchangers 26 of the air conditioning packs 22. When the aircraft is stationary, the controller 18 controls the rotational speed of the ram air fan 14 to control the amount of air moved across the heat exchangers 26.

The example ram air fan 14 includes a rotor 30 and a motor (not shown) within a housing 34. A terminal block 38 is mounted to an exterior surface of the housing 34. The terminal block is a type of electrical connection assembly for the ram air fan 14.

A lid 40 covers an interior 46 of the terminal block 38. Electrical motor leads 42 extend from the motor to the interior 46. Electrical controller leads 50 extend from the controller 18 to the interior 46. The controller leads 50 are electrically coupled to the motor leads 42 within the interior 46 of the terminal block 38.

In this example, the controller leads 50 and the motor leads 42 electrically couple the controller 18 to the motor (within the housing 34). The motor is a three phase motor in this example. Thus, three motor leads 42 are coupled to three controller leads 50 (one for each phase). The controller 18 controls the motor via signals transmitted along the controller leads 50 and the motor leads 42.

Referring now to FIGS. 5-8 with continuing reference to FIGS. 1-4, within the terminal block 38, a plurality of terminal studs 58 are held within a base 64. The terminal studs 58 each include a threaded portion 62 extending from a head 66. The threaded portion 62 includes threads along a distance x. The remaining areas of the threaded portion 62 do not include threads.

The terminal studs 58 are held within the terminal block 38 by the base 64. More specifically, the threaded portions 62 extend through apertures 68 in the base 64, and the head 66 is held within one of three slots 72 established within the base 64. Each of the slots 72 holds two of the heads 66. The apertures 68 are located in a floor 74 of the slots 72.

The threaded portions 62 of the example terminal studs 58 are each ⅜th inch (9.525 mm) in diameter and extend between about 0.930 inches and 0.950 inches (23.622 mm and 24.130 mm) from the head 66.

The example head 66 is hexahedronal. That is, the head 66 includes six planar faces or walls. In this example, the sidewalls 76 are perpendicular to the endwalls 80. The head 66 acts as an antirotation feature, in this example.

Sidewalls 76 of the head 66 each face a sidewall 84 of the slots 72. Endwalls 80 of the head 66 face either an endwall 88 of the slots 72, or the head 66 of another terminal stud 58.

The sidewalls 84 and the endwalls 88 are considered slot walls because the sidewalls 84 and the endwalls 88 provide the slot 72. The sidewalls 84 are perpendicular to the endwalls 88, in this example.

Figure 5:
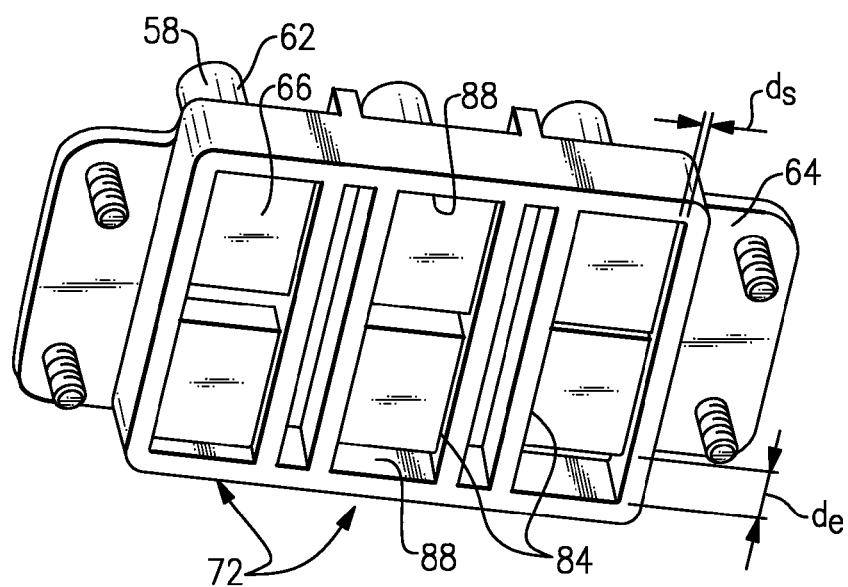
FIG. 5 shows terminal studs within a base of the terminal block.
Figure 6:
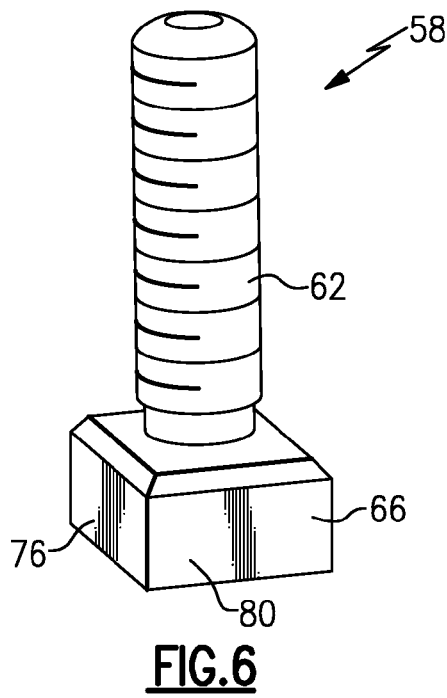
FIG. 6 shows a perspective view of one of the terminal studs.
Figure 7:
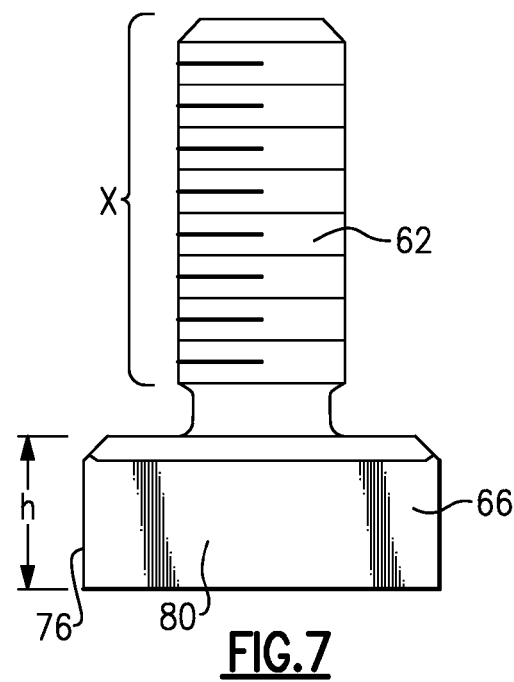
FIG. 7 shows a side view of the FIG. 6 terminal stud.
Figure 8:
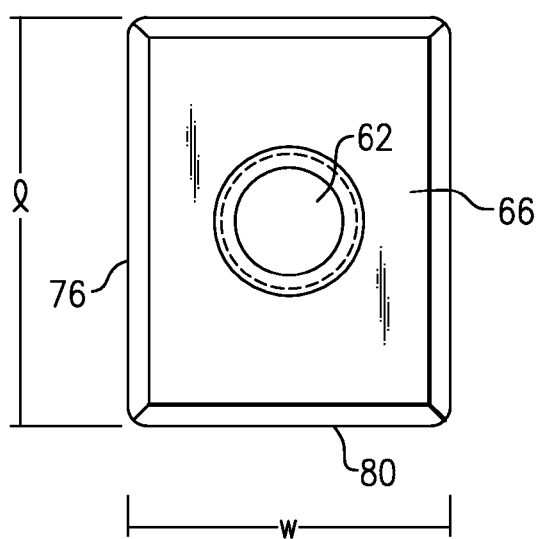
FIG. 8 shows a top view of the FIG. 6 terminal stud.

In this example, the sidewalls 76 of the head 66 are closer to the sidewalls 84 of the base 64 than the endwalls 80 of the head 66 are to the endwalls 88 of the base 64. That is, the distance $d_s$ is less than the distance de (FIG. 5).

A tabbed connector 90a of the motor leads 42 and a tabbed connector 90b of the controller leads 50 both receive threaded portions 62 of the terminal studs 58. In this example, one of the tabbed connectors 90a and one of the tabbed connectors 90b each receive two of the terminal studs 58.

Threaded fasteners, such as nuts 92, are then torqued to the threaded portions 62 to hold the tabbed connectors 90a and 90b. As can be appreciated, torquing the nuts 92 to the terminal stud 58 imparts a rotational force to the terminal stud 58. Notably, if the base 64 does not sufficiently prevent rotation of the terminal stud 58, some portion of the terminal block 38 may become damaged or interfere with the electrical coupling of the motor leads 42 to the controller leads 50.

In this example, the sidewalls 76 of the head 66 contact the sidewalls 84 of the base 64 to limit rotation of the terminal stud 58 as the nut 92 is torqued to the threaded portion 62. The sidewalls 76 contact the base 64, rather than the endwalls 80, because the sidewalls 76 are closer to the base 64 than the endwalls 80. Because the sidewalls 76 are configured to contact the base 64, the sidewalls 76 are considered to interface directly with the base 64.

The sidewalls 84 of the example base 64 each interact with sidewalls 76 from two of the heads 66 because each of the slots 72 holds two of the heads 66. The sidewalls 76 from two of the heads thus interact with a common sidewall 76.

The sidewalls 76 have a length l and a height h. Changing the length l and the height h changes the area of the sidewalls 76, which changes how the sidewalls 76 interface with the sidewalls 84 of the base 64. The endwalls 80 have a width w and the height h.

In this example, a ratio of the length l to the height h of the sidewalls 76 is from 2.18 to 2.35. Also, a ratio of the length l to the width w of the endwalls 80 is from 1.67 to 1.80.

In one specific example, the length l is from 0.765 inches to 0.775 inches (19.431 mm to 19.685 mm), the height h is from 0.330 inches to 0.340 inches (8.382 mm to 8.636 mm), and the width w is from 0.585 inches to 0.595 inches (14.859 mm to 15.113 mm). The example sidewalls 76 have an area that is from 2.18 inches$^2$ to 2.35 inches$^2$ (1406.448 mm$^2$ to 1516.126 mm$^2$).

Features of the disclosed examples include a terminal stud that effectively limits rotation while minimizing its weight contribution to the overall design.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A terminal stud of a ram air fan connection assembly, comprising:
    a terminal stud having a threaded portion extending from a head that is held within a slot of a base, the head having a sidewall interfacing directly with a wall of the base, the sidewall having a length and a height, wherein a ratio of the length to the height is from 2.18 to 2.35; and
    a second terminal stud that is received within the slot of the base.

2. The terminal stud of claim 1, wherein the head is a hexahedronal.

3. The terminal stud of claim 1, wherein the sidewall is configured to contact the wall when a threaded fastener is secured to the threaded portion.

4. The terminal stud of claim 1, wherein the head has an endwall that is generally perpendicular to the sidewall, the endwall having a width, wherein a ratio of the length of the sidewall to the width of the endwall is from 1.67 to 1.80.

5. The terminal stud of claim 1, wherein the wall provides a portion of the slot.

6. A ram air fan terminal block, comprising:
    a housing;
    a base having a plurality of slot walls that provide a slot; and
    a plurality of terminal studs each having a threaded portion extending from a head, the head received within the slot and the threaded portion extending through an aperture in the base, wherein the head has a sidewall that interfaces directly with one of the plurality of slot walls, and a ratio of a length of the sidewall to a height of the sidewall is from 2.18 to 2.35, wherein the head has an endwall that is generally perpendicular to the sidewall, the endwall having a width that is less than the length of the sidewall.

7. The ram air fan terminal block assembly of claim 6, wherein the head is a hexahedronal head.

8. The ram air fan terminal block assembly of claim 7, wherein the slot receives the heads of two terminal studs.

9. The ram air fan terminal block assembly of claim 8, wherein the two terminal studs electrically couple a ram air fan motor lead to a controller lead.

10. The ram air fan terminal block assembly of claim 6, wherein the sidewall has an area that is from 2.18 to 2.35 square inches.

11. The ram air fan terminal block assembly of claim 6, wherein the head has an endwall that is generally perpendicular to the sidewall, the endwall having a width, wherein a ratio of the length of the sidewall to the width of the endwall is from 1.67 to 1.80.

12. The ram air fan terminal block assembly of claim 6, wherein the aperture is located in a floor of the slot.

13. A method of electrically coupling a ram air fan assembly motor to a controller, comprising:
    (a) torquing a threaded fastener to a terminal stud to hold a lead of a ram air fan motor in an electrically coupled position with a lead of a controller; and
    (b) contacting a sidewall of a head of the terminal stud to limit rotation of the terminal stud during the torquing, the sidewall having a length and a height, wherein a ratio of the length to the height is from 2.18 to 2.35, wherein the head has an endwall that is generally perpendicular to the sidewall, the endwall having a width that is less than the length of the sidewall.

14. The method of claim 13, including holding the lead of the ram air fan motor in an electrically coupled position with the lead of the controller using a second terminal stud.

15. The method of claim 14, including contacting the sidewall of both terminal studs with a common wall of a base.

16. The method of claim 13, wherein the head has an endwall that is generally perpendicular to the sidewall, the endwall having a width, wherein a ratio of the length of the sidewall to the width of the endwall is from 1.67 to 1.80.

17. The method of claim 13, including contacting the sidewall with a slot wall.

18. The terminal stud of claim 1, wherein the head has an endwall that is generally perpendicular to the sidewall, the endwall having a width that is less than the length of the sidewall.

* * * * *